UNITED STATES PATENT OFFICE

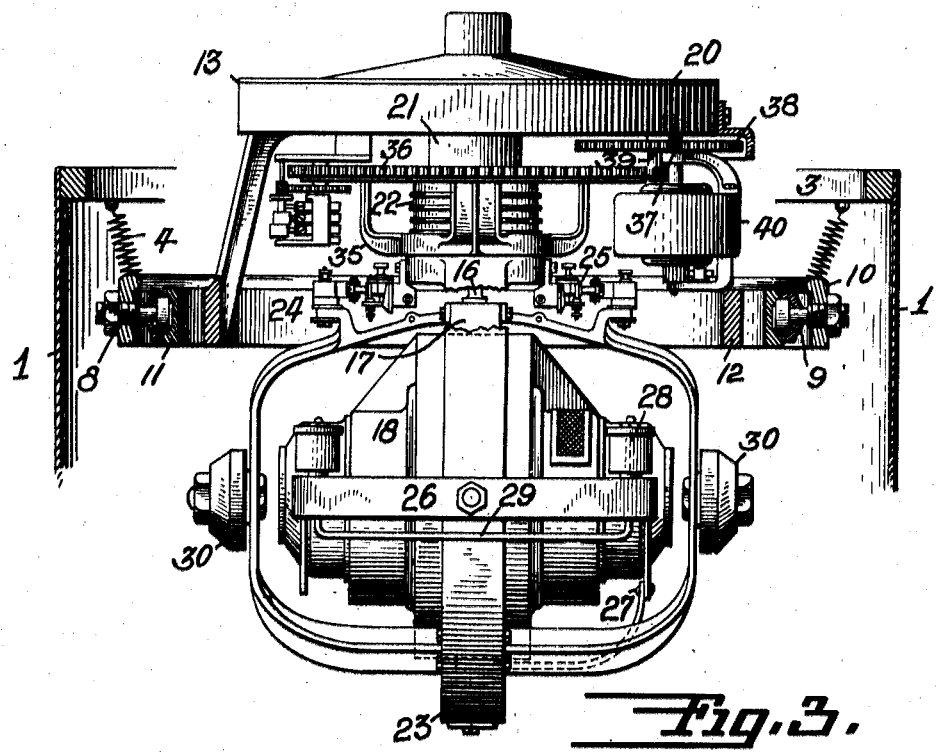
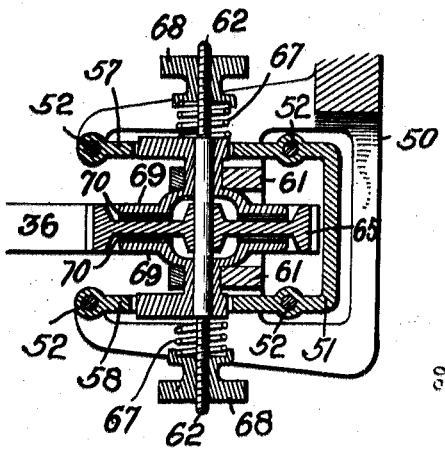
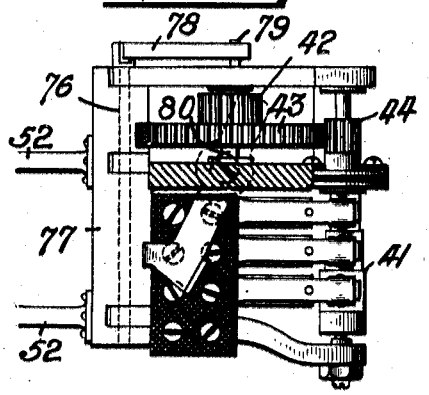

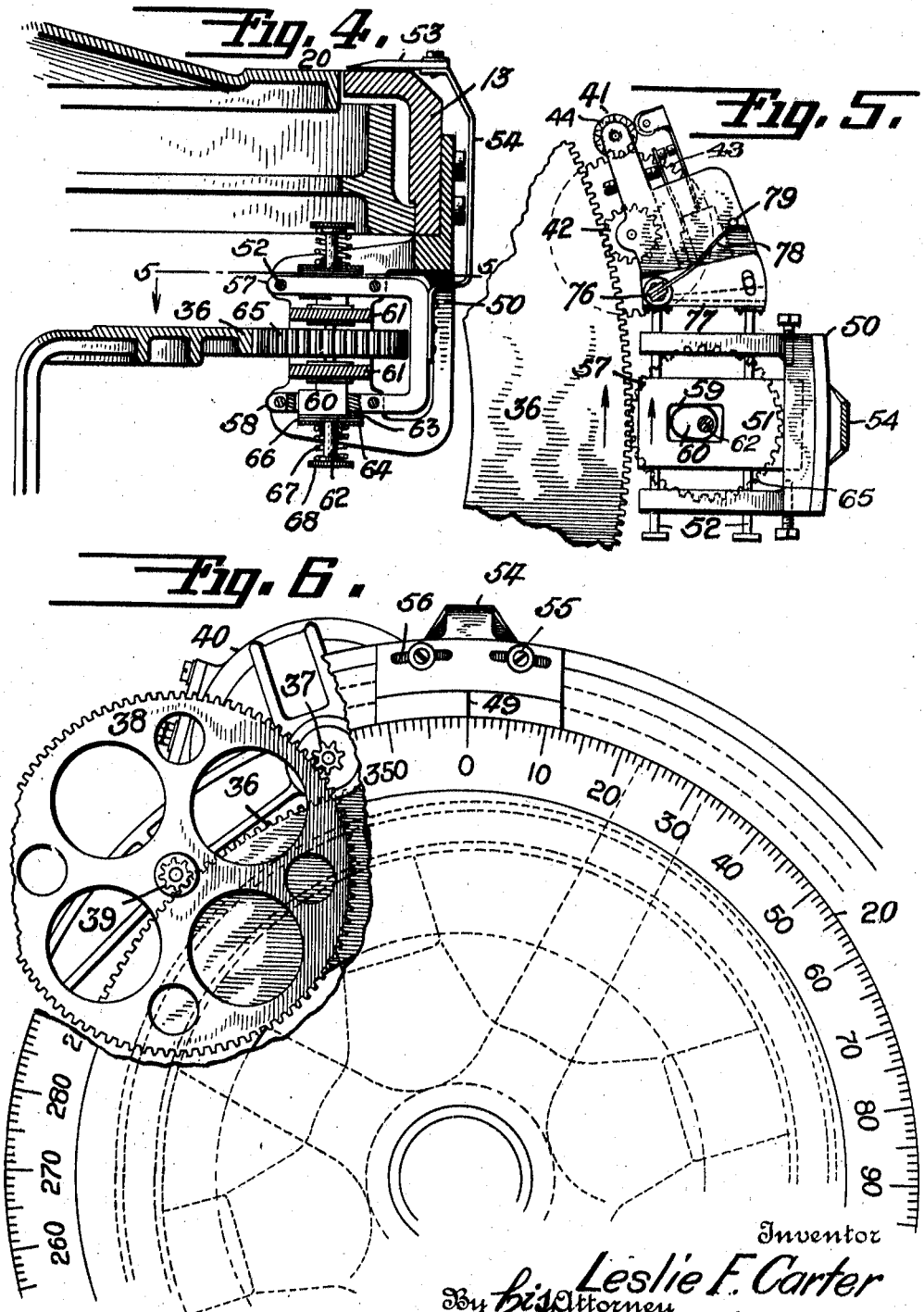

LESLIE F. CARTER, OF LEONIA, NEW JERSEY, ASSIGNOR, BY MESNE ASSIGNMENTS, TO THE SPERRY GYROSCOPE COMPANY, INC., OF BROOKLYN, NEW YORK, A CORPORATION OF NEW YORK

GYROSCOPIC COMPASS

Application filed December 19, 1922. Serial No. 607,773.

This invention relates to gyroscopic compass units comprising a master compass and a plurality of repeater compasses controlled thereby. More particularly, this invention relates to those gyroscopic compasses in which the card and the system of which said card forms a part are subject to "hunt", i. e., continuous oscillations to overcome static friction. This hunt renders exact reading of the master compass difficult and may result in errors in the repeater compasses where such readings are taken for the purpose of synchronizing the repeater compasses with the master compass. It is the principal object of this invention to provide means for obviating this difficulty in obtaining exact readings of a compass card subject to hunting oscillations. For this purpose I propose to impart to the usual stationary lubber-line or pointer, a hunt similar to the hunt of the compass-card and in synchronism therewith, so that the lubber line and card will be relatively stationary when the card is subject to no other movements than the hunt oscillations.

It is a further object of this invention to provide means for preventing transmission of the hunt to the repeater compasses. For this purpose I propose to impart to the operative member of the transmitter a hunt similar to the hunt of the operative member of the follow-up system and in synchronism therewith.

A further object of this invention is the provision of a single means for imparting the hunt to both the lubber line and the operative member of the transmitter.

A further object is the provision of a lubber-line mounted upon a member subject to hunt and which is adjustable on said member.

Other objects and advantages will be apparent as the description proceeds.

Fig. 1 is a front elevation, partly sectioned vertically, of a master gyroscopic compass to which my invention is applied.

Fig. 2 is a vertical section through one type of friction clutch between the master compass and the transmitter.

Fig. 3 is a front elevation of a transmitter mounted according to my invention.

Fig. 4 is a vertical section showing a compass-card, index, and means for imparting a hunt to said index.

Fig. 5 is a plan view taken on the line 5—5 of Fig. 4.

Fig. 6 is a plan view, with parts broken away, of the compass shown in Fig. 1.

Referring to the drawings, the compass is mounted within a cylindrical housing 1. At the top a heavy ring 3 is provided for supporting, preferably by a spring suspension 4, the gimbal ring 10 supporting the compass proper. The second ring 11 is supported on horizontal pivots 8 and 9 within ring 10, said second ring supporting an inner ring 12 on pivots at right angles to pivots 8 and 9. The ring 12 has fixed thereto a framework including the ring 13. The latter is formed integral with a central hub (not shown) which supports the sensitive element including the suspension 16, vertical frame 17, and gyro casing 18 mounted on a horizontal, pivotal axis in said frame. A follow-up system from said sensitive element includes the card 20, hub 21, current-conducting slip-rings 22 for leading current into the compass, and phantom ring 23. The brushes (not shown) cooperating with slip-rings 22 are carried by frame 13. Electrical connections between the sensitive element and the follow-up system are provided by trolley poles 24 carried by vertical frame 17 and cooperating with pairs of contacts 25 on the follow-up system, each pair separated by insulating strips.

The compass is of the mercury ballistic type in which a pair of mercury-containing cups 28 connected by a tube 29 are mounted at each side upon a bar 26 pivoted on phantom ring 23. An arm 27 extends downwardly from each end of the bar 26 and is adapted to engage a pin (not shown) on the gyro-casing. An adjustable weight 30 may be provided at each side of vertical frame 17 for balancing the same.

The phantom-ring 23 carries at its upper end a spider or frame 35 to which is fixed a gear 36 which meshes with a train of gears 37, 38, 39 operated by the reversible azimuth motor 40. Said motor is provided in the well-known manner with two oppositely-wound fields connected to trolleys 24 and contacts 25 so as to cause continuous oscillatory movement of the follow-up system (including card 20). Said oscillatory movement is commonly termed the "hunt" and is adapted to overcome the static friction of the system. Upon change in direction of the ship upon which the compass is mounted, trolleys 24 will engage those contacts 25 which will cause azimuth motor 40 to operate continuously in one direction until the follow-up has caught up with the sensitive system, whereupon the hunting movements are resumed.

The movements of the card are transmitted to one or more repeater compasses by means of a transmitter 41 (see Figs. 3 and 5) operated by means of gear wheel 36 meshing with gear train 42, 43, 44 of the transmitter. The matter of transmitting readings of a master compass to repeater compasses is now well understood in the art and need not be further described (see patent to Elmer A. Sperry #1,296,440, dated March 4, 1919 for repeater system for gyro compasses).

It is apparent that the card is continuously oscillating relative to a fixed index, which makes exact reading of the card difficult This difficulty may be removed by causing the index to oscillate in synchronism with the card during the hunt movements thereof, so that no relative movement takes place between the card and the index. For this purpose (referring to Figs. 2 and 5) there is provided a bracket 50 depending from ring 13 and in which is mounted a carriage 51 connected to a plurality of rods 52 slidable in said bracket. The index comprises an index plate 53 adjustably attached to a bracket, or carrying member, 54, by means of screws 55 operating in slots 56 in said plate, the bracket 54 being rigidly attached to carriage 51. Upon index-plate 53 is provided the lubber-line 49. Said carriage comprises upper and lower members 57 and 58, each having slots or cut-out portions 59 in alignment, in each of which is mounted for operation a cam 60 swiveled in plates 61 fixed to the carriage. The slots 59 are slightly elongated and the cams or eccentrics 60 may be slightly elongated at one end so as to permit a small amount of angular movement thereof in said slot. The cams are driven through a gear 65, meshing with gear 36 of the follow-up system, and fixed upon a shaft 62 extending freely through the cams and having engagement therewith through adjustable friction-clutches. These clutches may be of any well-known type. In Fig. 2 each cam is provided with a hub encircling shaft 62 and journaled in brackets 61 on the frame 50. Said hubs are provided with flat surfaces 69 on the inner ends thereof pressing against leather or other friction washers 70 on the flat surfaces of gear 65. The cams are pressed into engagement with the washers by means of the springs 67 held in adjusted tension by nuts 68 threaded on the ends of shaft 62. Alternative friction-clutches are shown in Fig. 4 wherein the friction surfaces comprise a plate 63 on the outer end of each cam, a flanged hub 64 slidable on shaft 62, and a washer 66 interposed between said plate and hub. Spring 67 presses against the flanged hub and the tension thereof may be varied by nut 68.

It will be apparent that the gear 65, the cams 60 and slots 59 may be so formed that the amount and rate of movement of carriage 51 and lubber-line 49 caused by the hunting movements of the follow-up system may be made equal to that of the card. From the gearing, as described, it is obvious that adjacent portions of gear 36 and carriage 51 will move in substantially the same linear direction (as shown by the arrows in Fig. 5), and hence the card and the lubber-line will move in the same direction, at the same speed and for equal distances, so that no relative movement takes place between the card and the lubber-line during the "hunt" of the compass. When the vessel upon which the compass is mounted, changes its direction, and the follow-up system moves through more than the angle of hunt, the cams 60 strike the rear walls of openings 59 as soon as the angle of hunt has been traversed and thereafter slipping takes place in the friction clutches between the cams and the shaft 62 as the gears 36 and 65 continue to rotate in the same direction. As soon as the follow-up system moves through an angle not exceeding the angle of hunt, the lubber-line will move again in synchronism with the card in either direction.

Ordinarily the hunt of the card is communicated through transmitter 41 to the repeater compasses. To prevent transmission of these movements, the operative member of the transmitter (gear 42), which governs the movements of the repeater, may be given a movement equal in amplitude and in the same direction as the operative member (gear 36) of the azimuth motor, so that no relative movement takes place between the azimuth gear 36 and the transmitter gear 42 during hunting movements of the follow-up system. The oscillatory movements of the carriage 51 may be employed not only to impart a "hunt" to the index equal to that of the card, but also to prevent transmission of said "hunt" to the repeater compasses. To this end, the transmitter 41 is pivotally mounted by a vertical king-bolt 76 (see Figs. 3 and 5) upon a bracket 77 fixed to the rods 52 of the carriage. A spring 78 fixed at one end of bolt 76 presses at its other end upon a pin 79 fixed to the transmitter to keep the gear 42 of said transmitter in engagement with the gear 36, so that the substantially rectilinear movement of the carriage is translated into curvilinear movements of the transmitter parallel to the periphery of the gear 36. Ordinary hunt movements of gear 36 would, if the axis 80 of gear 42 were stationary, cause oscillation of gear 42 and consequent transmission of the hunt to the repeater compasses. By the hereinbefore described structure, carriage 51, and hence the transmitter 41 moves in synchronism with the gear 36 during the hunt oscillations thereof. Therefore, the axis of gear 42 has imparted thereto a hunt equal to, at the same rate and in the same direction as the hunt of the follow-up system. Hence the gears 36 and 42 do not move relative to each other during the normal hunt of the follow-up system, and said hunt is not transmitted to the repeater compasses; but as soon as gear 36 moves beyond the range of the hunt oscillations, and hence, beyond the range of movement of carriage 51, the gear 42 will be rotated to operate the repeater compasses through the angle of movement of the follow-up system in excess of the hunt.

In accordance with the provisions of the patent statutes, I have herein described the principles of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a gyroscopic compass having a card subject to hunt, an index cooperating with said card, and means controlling the movement of said index so as to impart a like hunt thereto.

2. In a gyroscopic compass having a follow-up system subject to hunt, said system including a card, an index cooperating with said card, and means connecting said system and said index whereby a like hunt is imparted to said index.

3. In a gyroscopic compass having a follow-up system subject to hunt, said system including a card, an index cooperating with said card, and means connecting said system and said index whereby a hunt is imparted to said index in synchronism with said card, said means including mechanism for rendering said connecting means ineffective when said system moves beyond the angle of hunt.

4. In a gyroscopic compass having a follow-up system subject to hunt, said system including a card, an index cooperating with said card, means connecting said system and said index whereby a hunt is imparted to said index in sychronism with said card, and means for preventing the movement of said index beyond the angle of hunt, said connecting means including slip-friction clutches for permitting movement of said system beyond the angle of hunt.

5. In a gyroscopic compass having a follow-up system subject to hunt, said system including a card, a slidable carriage, an index fixed to said carriage and cooperating with said card, and means connecting said system and said carriage for reciprocating said carriage in synchronism with said system.

6. In a gyroscopic compass having a follow-up system subject to hunt, said system including a card, a slidable carriage, an index fixed to said carriage and cooperating with said card, and means connecting said system and said carriage for reciprocating said carriage in synchronism with said system, said means including a cam and having means whereby the throw of said cam is limited to the amplitude of said hunt.

7. In a gyroscopic compass having a follow-up system subject to hunt, said system including a card, a slidable carriage, an index fixed to said carriage and cooperating with said card, means connecting said system and said carriage for reciprocating said carriage in synchronism with said system, said means including cam and having means whereby the throw of said cam is limited to the amplitude of said hunt, said connecting means including slip-friction clutches permitting movement of said system beyond the angle of hunt.

8. In a gyroscopic compass unit comprising a master compass having a follow-up system subject to hunt, and a transmitter driven thereby and adapted to actuate a repeater compass, means for preventing transmission of the hunt to the repeater compass, said means comprising means for imparting a hunt to said transmitter in synchronism with the hunt of said system.

9. In a gyroscopic compass unit comprising a master compass having a follow-up system subject to hunt, and a transmitter driven thereby and adapted to actuate a repeater compass, means for preventing transmission of the hunt to the repeater compass, said means comprising means operated by said system for imparting a hunt to said ansmitter in synchronism with the hunt of said system to render said transmitter ineffective within the angle of hunt of said system.

10. In a gyroscopic compass unit comprising a master compass adapted to actuate a repeater compass, said master compass having an operating member subject to hunt, a transmitter adapted to be connected to said repeater compass and having an operating member, mechanism connecting said first-named member to said operating member including means for imparting a hunt to said second-named operating member in synchronism with said first-named member to render said transmitter ineffective within the angle of hunt of said first-named member.

11. In a gyroscopic compass unit comprising a master compass adapted to actuate a repeater compass, said master compass having an operating gear subject to hunt, a transmitter adapted to control said repeater compass and having an operating gear meshing with said first-named gear, and means connected to said first-named gear for moving the axis of said second-named gear in synchronism with said first-named gear to render said transmitter ineffective within the angle of hunt of said first-named gear.

12. In a gyroscopic compass unit comprising a master compass having a follow-up system subject to hunt, and a transmitter connected to said master compass and adapted to actuate a repeater compass, means for preventing transmission of the hunt to said repeater compass, said means comprising means operated by said system for imparting a hunt to said transmitter in synchronism with the hunt of said system to render said transmitter ineffective within the angle of hunt of said system but permitting said transmitter to be rendered effective when said system exceeds said angle of hunt.

13. In a gyroscopic compass unit comprising a master compass adapted to actuate a repeater compass, said master compass having an operating gear subject to hunt, a transmitter adapted to be connected to said repeater compass and having an operating gear meshing with said first-named gear, and means connected to said first-named gear for moving the axis of said second-named gear to render said transmitter ineffective within the angle of hunt of said first-named gear but permitting said transmitter to be rendered effective when said first-named gear exceeds said angle of hunt.

14. In a gyroscopic compass unit comprising a master compass adapted to actuate a repeater compass, said master compass having an operating gear subject to hunt, a transmitter adapted to be connected to said repeater compass and having an operating gear meshing with said first-named gear, and means connected to said first-named gear for imparting movement to the axis of said second-named gear substantially parallel to the periphery of said first-named gear to move said second-named gear in synchronism with said first named gear within the angle of hunt thereof.

15. In a gyroscopic compass unit comprising a master compass having a follow-up system subject to hunt, said system including a card, and a transmitter for transmitting the gyroscopic compass readings to a distance, an index cooperating with said card, and a single means for imparting a hunt to said index and to said transmitter in synchronism with the hunt of said system.

16. In a gyroscopic compass unit comprising a master compass having a follow-up system subject to hunt, said system including a card, and a transmitter adapted to actuate a repeater compass, an index cooperating with said card, a carriage upon which said index and transmitter are mounted, and means for imparting to said carriage a hunt in synchronism with the hunt of said system.

17. In a gyroscopic compass unit comprising a master compass having a follow-up system subject to hunt, said system including a card, and a transmitter for transmitting to a distance the readings of said master compass, an index cooperating with said card, a carriage upon which said index and transmitter are mounted, and means for imparting to said carriage a hunt in synchronism with said system, said means including mechanism for preventing movement of said carriage beyond the hunt of said system.

18. In a gyroscopic compass unit comprising a master compass having a follow-up system subject to hunt, said system including a card and an operating gear, and a transmitter connected to said gear, an index cooperating with said card, a carriage upon which said index and transmitter are mounted, and means for imparting substantially rectilinear reciprocatory movement to said carriage in synchronism with the hunt of said system, said means including mechanism whereby said movement of said carriage causes substantially curvilinear movement of said transmitter.

In testimony whereof I have affixed my signature.

LESLIE F. CARTER.